United States Patent
Han (10) Patent No.: US 10,450,976 B2
(45) Date of Patent: Oct. 22, 2019

(54) CDA SYSTEM AND CONTROL METHOD FOR THE SAME

(71) Applicants: Hyundai Motor Company, Seoul (KR); Kia Motors Corporation, Seoul (KR)

(72) Inventor: Kyoungchan Han, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 199 days.

(21) Appl. No.: 15/629,470

(22) Filed: Jun. 21, 2017

(65) Prior Publication Data

US 2018/0135543 A1 May 17, 2018

(30) Foreign Application Priority Data

Nov. 14, 2016 (KR) .................. 10-2016-0151255

(51) Int. Cl.
*F02D 41/00* (2006.01)
*F02D 13/02* (2006.01)
(Continued)

(52) U.S. Cl.
CPC .......... *F02D 41/0087* (2013.01); *F02B 37/00* (2013.01); *F02D 13/06* (2013.01);
(Continued)

(58) Field of Classification Search
CPC ............. F02D 41/0087; F02D 41/1446; F02D 2041/0012; F02D 13/06; F02D 13/0203;
(Continued)

(56) References Cited

U.S. PATENT DOCUMENTS 3,702,111 A * 11/1972 Weaving ............. F02D 13/0276
123/568.2
4,192,265 A * 3/1980 Amano ............... F02D 13/0276
123/308
(Continued)

FOREIGN PATENT DOCUMENTS

JP          5-5432 A       1/1993
JP      2004-132188 A      4/2004
(Continued)

OTHER PUBLICATIONS

An English Machine Translation of the reference to Maehara Isato et al. (Pub. No. JP 2005-214035 A), published on Aug. 11, 2005.*
(Continued)

*Primary Examiner* — Thai Ba Trieu
(74) *Attorney, Agent, or Firm* — Morgan, Lewis & Bockius LLP (57) ABSTRACT

A cylinder deactivation (CDA) system and a control method for the same and the CDA system may include a plurality of cylinder; a cylinder deactivation (CDA) apparatus selectively are configured to de-activate an operation of an exhaust valve of the partial cylinder among the plurality of cylinders; a connection pipe connecting the de-activated cylinder to the normally operated cylinder among the plurality of cylinders; an auxiliary valve apparatus configured for opening or closing the connection pipe to supply a compressed air of the de-activated cylinder among the plurality of cylinders to the normally operated cylinder; a vehicle operation state measuring device configured for measuring a vehicle operation state to output a corresponding signal; and a controller configured for controlling operations of the CDA apparatus and the auxiliary valve apparatus depending on the corresponding signal of the vehicle operation state measuring device.

10 Claims, 5 Drawing Sheets

(51) Int. Cl.
*F02D 17/02* (2006.01)
*F02D 41/14* (2006.01)
*F02B 37/00* (2006.01)
*F02D 13/06* (2006.01)

(52) U.S. Cl.
CPC ...... *F02D 41/1446* (2013.01); *F02D 13/0203* (2013.01); *F02D 17/02* (2013.01); *F02D 2041/0012* (2013.01); *F02D 2200/021* (2013.01); *F02D 2200/101* (2013.01); *F02D 2200/1002* (2013.01); *F02D 2200/501* (2013.01); *F02D 2200/602* (2013.01); *Y02T 10/144* (2013.01); *Y02T 10/18* (2013.01)

(58) Field of Classification Search
CPC ............... F02D 17/02; F02D 2200/021; F02D 2200/1002; F02D 2200/101; F02D 2200/501; F02D 2200/602; F02B 37/00; Y02T 10/144; Y02T 10/18
USPC ...... 60/605.1; 123/58.8, 198 F, 90.11, 90.15, 123/90.21
See application file for complete search history.

(56) References Cited

U.S. PATENT DOCUMENTS

| | | | | |
|---|---|---|---|---|
| 4,194,472 A * | 3/1980 | Amano | ............... | F02D 13/0276 123/308 |
| 4,538,574 A * | 9/1985 | Lombardi | ............... | F02B 37/02 60/612 |
| 4,957,073 A * | 9/1990 | Bergeron | ................ | F01L 1/285 123/308 |
| 5,072,700 A * | 12/1991 | Kawamura | ......... | F02D 13/0203 123/315 |
| 5,870,993 A * | 2/1999 | Stellet | ................. | F02D 13/0261 123/308 |
| 6,328,003 B1 * | 12/2001 | Gaertner | ............. | F02D 13/0276 123/568.12 |
| 7,509,805 B2 * | 3/2009 | Karlsson | ............... | F02B 37/002 60/612 |
| 8,620,560 B2 * | 12/2013 | Imai | ..................... | F02D 41/123 123/480 |
| 9,284,894 B2 | 3/2016 | Orban et al. | | |
| 2004/0168655 A1 * | 9/2004 | Hitomi | ................ | F02D 13/0257 123/58.8 |
| 2005/0205046 A1 * | 9/2005 | Lewis | ................. | F02D 13/0215 123/198 F |
| 2006/0005814 A1 * | 1/2006 | Michelini | ........... | F02D 41/0087 123/432 |
| 2008/0041327 A1 * | 2/2008 | Lewis | ................. | F02D 13/0215 123/179.3 |
| 2015/0167565 A1 * | 6/2015 | Lee | ....................... | F02D 17/026 123/559.1 |
| 2018/0216550 A1 * | 8/2018 | Idicheria | ............ | F02D 41/1475 |

FOREIGN PATENT DOCUMENTS

| | | |
|---|---|---|
| JP | 2004-251224 A | 9/2004 |
| JP | 2005-214035 A | 8/2005 |
| JP | 2006-336579 A | 12/2006 |
| JP | 2016-050534 A | 4/2016 |

OTHER PUBLICATIONS

An English Machine Translation of the reference to Hayasaka Masato et al. (Pub. No. JP 2006-336579 A), published on Dec. 12, 2006.*

* cited by examiner

CDA SYSTEM AND CONTROL METHOD FOR THE SAME

CROSS-REFERENCE TO RELATED APPLICATION

The present application claims priority to Korean Patent Application No. 10-2016-0151255 filed on Nov. 14, 2016, the entire contents of which is incorporated herein for all purposes by this reference.

BACKGROUND OF THE INVENTION

Field of the Invention

The present invention relates to a cylinder deactivation (CDA) system and a control method for the same. More particularly, the present invention relates to a cylinder deactivation (CDA) system for improving a fuel consumption by supplying a compressed air of a de-activation cylinder to a combust cylinder and a control method for the same.

Description of Related Art

In a general engine using a turbocharger, particularly in a diesel engine, during a cylinder de-activation, a boost pressure formation is not sufficient compared with a normal driving condition due to a reduction of an exhaust energy supplied to a turbocharger such that a fuel consumption improvement is limited.

An efficiency is improved due to a pumping reduction of the de-activation cylinder, however a load increasing of the operation cylinder is particularly restricted in a state that the boost pressure is not sufficient.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a cylinder deactivation (CDA) system for improving a fuel consumption by supplying a compressed air of a de-activation cylinder to a combust cylinder and a control method for the same.

A cylinder deactivation (CDA) system according to an exemplary embodiment of the present invention includes a plurality of cylinder; a cylinder deactivation (CDA) apparatus selectively de-activate an operation of an exhaust valve of the partial cylinder among the plurality of cylinders; a connection pipe connecting the de-activated cylinder to the normally operated cylinder among the plurality of cylinders; an auxiliary valve apparatus opening or closing the connection pipe to supply a compressed air of the de-activated cylinder among the plurality of cylinders to the normally operated cylinder; a vehicle operation state measuring device measuring a vehicle operation state to output a corresponding signal; and a controller controlling operations of the CDA apparatus and the auxiliary valve apparatus depending on the corresponding signal of the vehicle operation state measuring device.

The auxiliary valve apparatus may be opened during an expansion stroke of the de-activated cylinder.

The auxiliary valve apparatus may be opened to supply the compressed air of the de-activated cylinder to the compress stroke of the connected cylinder.

The operation state measuring device may include an engine speed sensor, an excel pedal opening sensor, a vehicle speed sensor, a torque sensor, a cooling coolant temperature sensor, an atmosphere temperature sensor, and an exhaust temperature sensor.

The controller may determine whether there are a CDA operation mode condition and a CDA operation maintenance condition depending on a signal of the operation state measuring device, and in a case of the CDA operation mode condition and the CDA operation maintenance condition, the controller may convert the operations of the CDA apparatus and the auxiliary valve apparatus into the CDA operation mode, or maintains the CDA operation mode.

A turbocharger operated by an exhaust gas of each cylinder may be further included.

A control method of a cylinder deactivation (CDA) system including a plurality of cylinder; a turbocharger operated by an exhaust gas of each cylinder: a cylinder deactivation (CDA) apparatus selectively de-activate an operation of an exhaust valve of the partial cylinder among the plurality of cylinders; a connection pipe connecting the de-activated cylinder to the normally operated cylinder among the plurality of cylinders; an auxiliary valve apparatus opening or closing the connection pipe to supply a compressed air of the de-activated cylinder among the plurality of cylinders to the normally operated cylinder; a vehicle operation state measuring device measuring a vehicle operation state to output a corresponding signal; and a controller controlling operations of the CDA apparatus and the auxiliary valve apparatus depending on the corresponding signal of the vehicle operation state measuring device according to an exemplary embodiment of the present invention includes determining whether an operation state of a current vehicle corresponds to a CDA operation mode condition depending on an output signal of the vehicle operation state measuring device through the controller; determining whether there is a CDA operation maintenance condition depending on the output signal of the vehicle operation state measuring device through the controller when the operation state of the current vehicle is the CDA operation mode condition; and converting the operations of the CDA apparatus and the auxiliary valve apparatus into the CDA operation mode through the controller when the operation state of the current vehicle corresponds to the CDA operation maintenance condition and the operation mode of the current engine is a general mode.

The CDA operation mode condition may include a condition that a vehicle speed is equal to or less than a predetermined value, a torque is equal to or less than a predetermined value, and an excel pedal opening value is equal to or less than a predetermined value.

The CDA operation maintenance condition may include a condition that a value determined from a fuel consumption of a case that the operation state of the current vehicle is a general mode and the fuel consumption of a case that the operation state of the current vehicle is a CDA mode is equal to or more than a predetermined value.

The CDA operation maintenance condition may include a condition that an temperature increasing effect is equal to or more than a predetermined value in a case that the operation state of the current vehicle is the CDA mode.

According to the CDA system and the control method for the same according to an exemplary embodiment of the present invention, the fuel consumption may be improved by supplying a compressed air of the de-activation cylinder to the combust cylinder. According to the CDA system and the control method for the same according to an exemplary embodiment of the present invention, the sufficient air supply to the operation cylinder is possible such that it is easy to raise an exhaust gas temperature.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration.

As those skilled in the art would realize, the described embodiments may be modified in various different ways, all without departing from the spirit or scope of the present invention Throughout the specification, components denoted by the same reference numerals are the same components.

In addition, unless explicitly described to the contrary, the word "comprise" and variations such as "comprises" or "comprising", will be understood to imply the inclusion of stated elements but not the exclusion of any other elements.

An exemplary embodiment of the present invention will hereinafter be described in detail with reference to the accompanying drawings.

Figure 1:
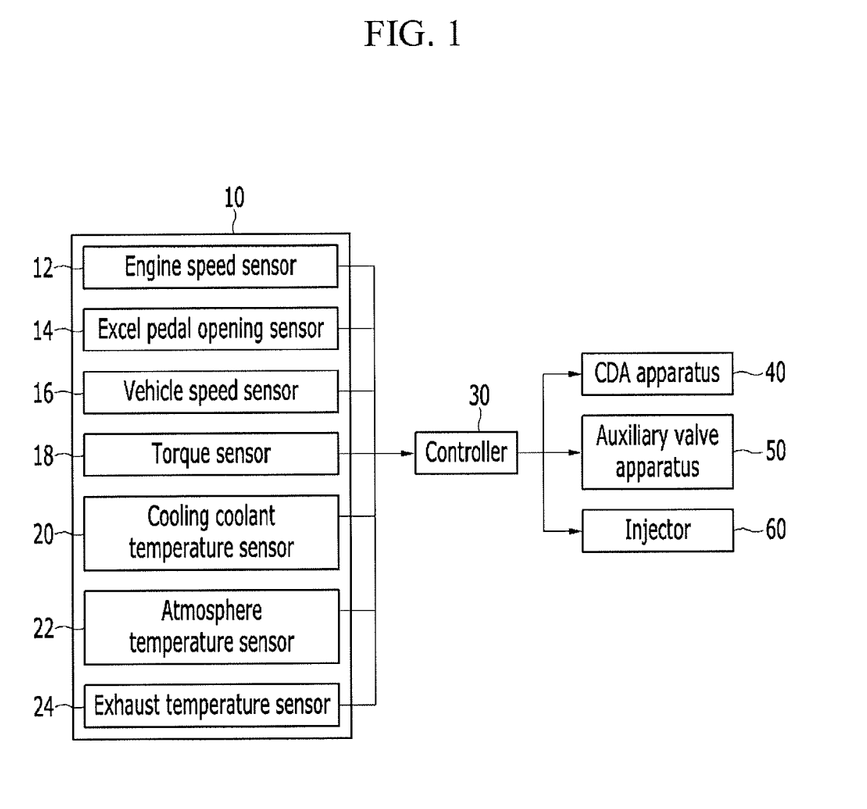
FIG. 1 is a block diagram of a cylinder deactivation (CDA) system according to an exemplary embodiment of the present invention.
Figure 2:
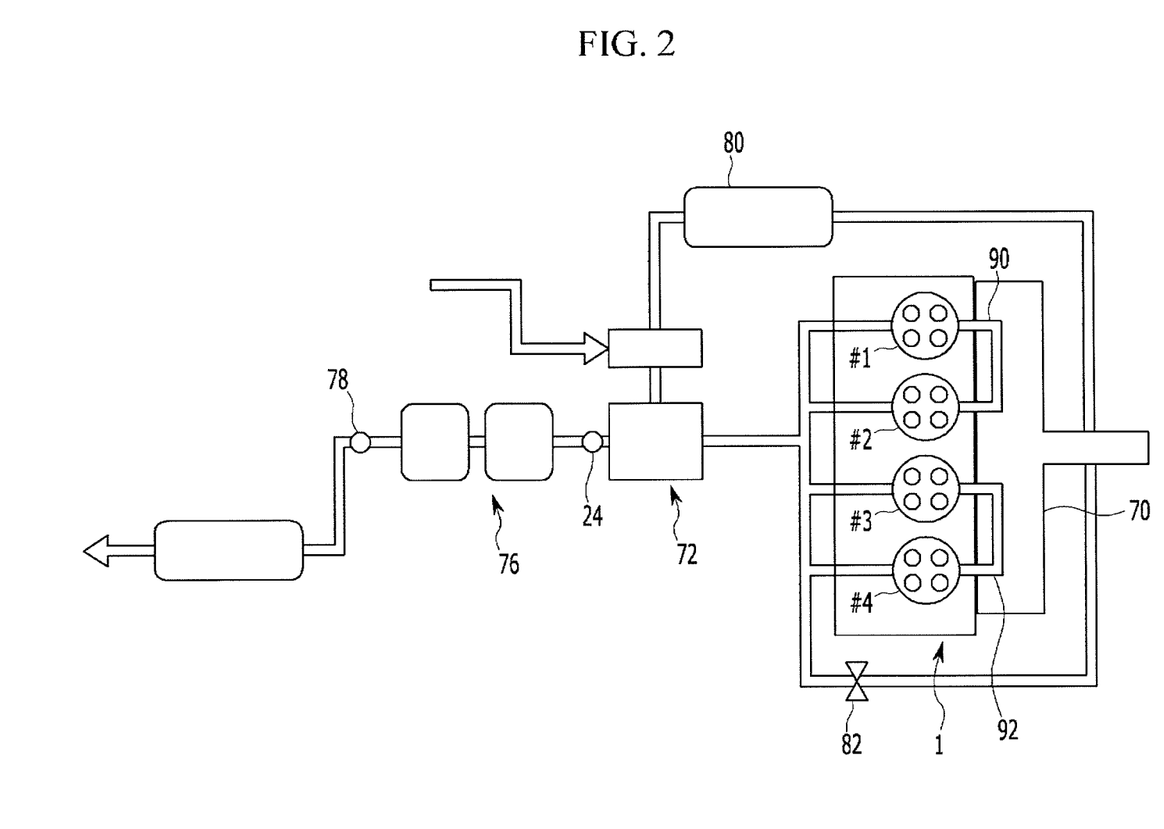
FIG. 2 is a schematic diagram of a cylinder deactivation (CDA) system according to an exemplary embodiment of the present invention.
Figure 3:
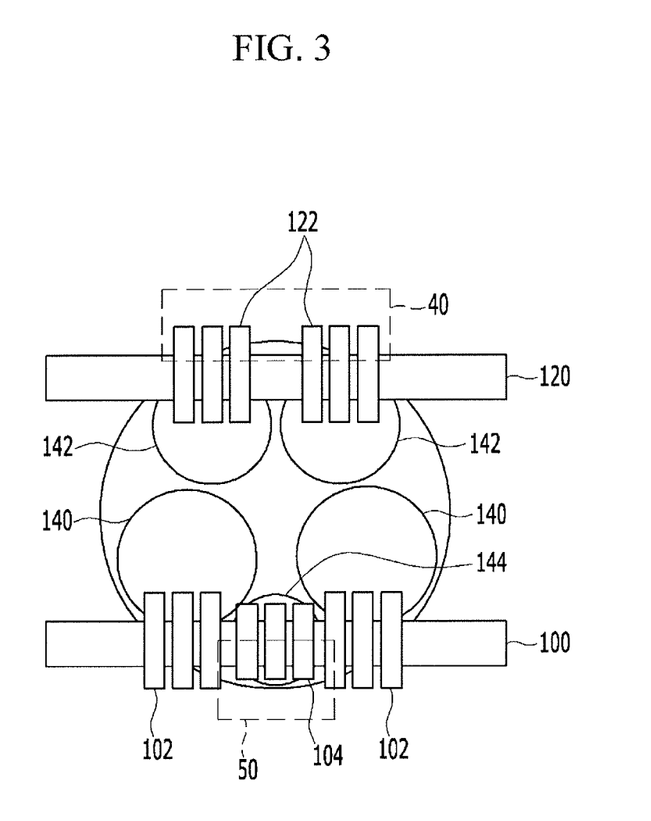
FIG. 3 is a view showing a valve train of a cylinder deactivation (CDA) system according to an exemplary embodiment of the present invention.

FIG. 1 is a block diagram of a cylinder deactivation (CDA) system according to an exemplary embodiment of the present invention, FIG. 2 is a schematic diagram of a cylinder deactivation (CDA) system according to an exemplary embodiment of the present invention, and FIG. 3 is a view showing a valve train of a cylinder deactivation (CDA) system according to an exemplary embodiment of the present invention.

Referring to FIG. 1 to FIG. 3, a cylinder deactivation (CDA) system according to an exemplary embodiment of the present invention includes a plurality of cylinders #1, #2, #3, and #4, a cylinder deactivation (CDA) apparatus 40 selectively de-activating an operation of an exhaust valve of the partial cylinder of the plurality of cylinders #1, #2, #3, and #4, connection pipes 90 and 92 connecting the cylinder that is de-activated and the cylinder that is normally operated among the plurality of cylinders #1, #2, #3, and #4, an auxiliary valve apparatus 50 opening or closing the connection pipes 90 and 92 to supply a compressed air of the de-activated cylinder to the normally-operated cylinder among the plurality of cylinders #1, #2, #3, and #4, a vehicle operation state measuring device 10 measuring a vehicle operation state to output a corresponding signal, and a controller 30 controlling operations of the CDA apparatus 40, the auxiliary valve apparatus 50 and injector 60 depending on the corresponding signal of the vehicle operation state measuring device 10.

An engine 1 applied to the CDA system according to an exemplary embodiment of the present invention include four cylinders #1, #2, #3, and #4 in the drawing, however it is not limited thereto and engines of all types configured for realizing a CDA mode may be applied.

For convenience of an understanding, the engine 1 applied to the CDA system according to an exemplary embodiment of the present invention is described as a 4-cylinder engine.

The operation state measuring device 10 may include an engine speed sensor 12, an excel pedal opening sensor 14, a vehicle speed sensor 16, a torque sensor 18, a cooling coolant temperature sensor 20, an atmosphere temperature sensor 22, and an exhaust temperature sensor 24.

The CDA system according to an exemplary embodiment of the present invention may include a post-processing apparatus 76 including a turbocharger 72, a diesel oxidation catalyst (DOC), a soot filtering apparatus (Diesel Particulate Filter, DPF), a selective reduction catalyst (SCR), a temperature sensor 78 measuring a temperature of an exhaust gas passing through the post-processing apparatus 76, an inter cooler 80 cooling a mixture of the turbocharger and a fresh air, and an EGR valve 82.

Referring to FIG. 3, an intake camshaft 100 is equipped with an intake cam 102 and an auxiliary cam 104, and an exhaust camshaft 120 is equipped with an exhaust cam 122.

The intake cam 102, the auxiliary cam 104, and the exhaust cam 122 drive valves to respectively open or close an intake port 140, an auxiliary port 144, and an exhaust port 142.

When the CDA apparatus 40 is operated by the operation of the controller 30, the exhaust port 142 is closed.

When the auxiliary valve apparatus 50 is operated by the operation of the controller 30, the auxiliary port 144 is closed and opened.

The CDA apparatus 40 and the auxiliary valve apparatus 50 include variable apparatuses maintaining or de-activating a driving of the valves, and a configuration and an operation of the variable apparatuses are obvious to ordinary technicians in the Field of the Invention such that a detailed explanation is omitted.

Figure 4:
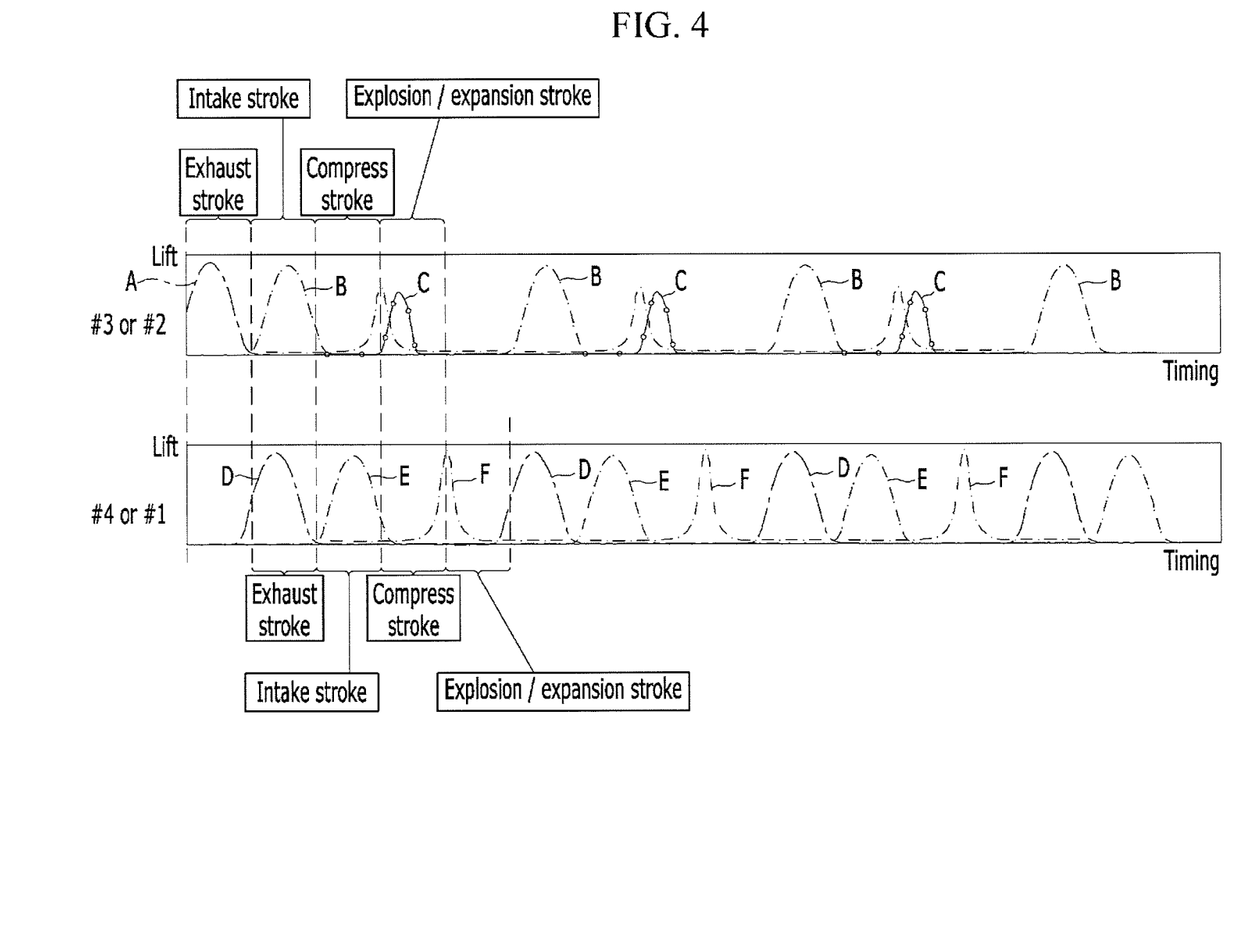
FIG. 4 is a view explaining an operation of a cylinder deactivation (CDA) system according to an exemplary embodiment of the present invention.
Figure 5:
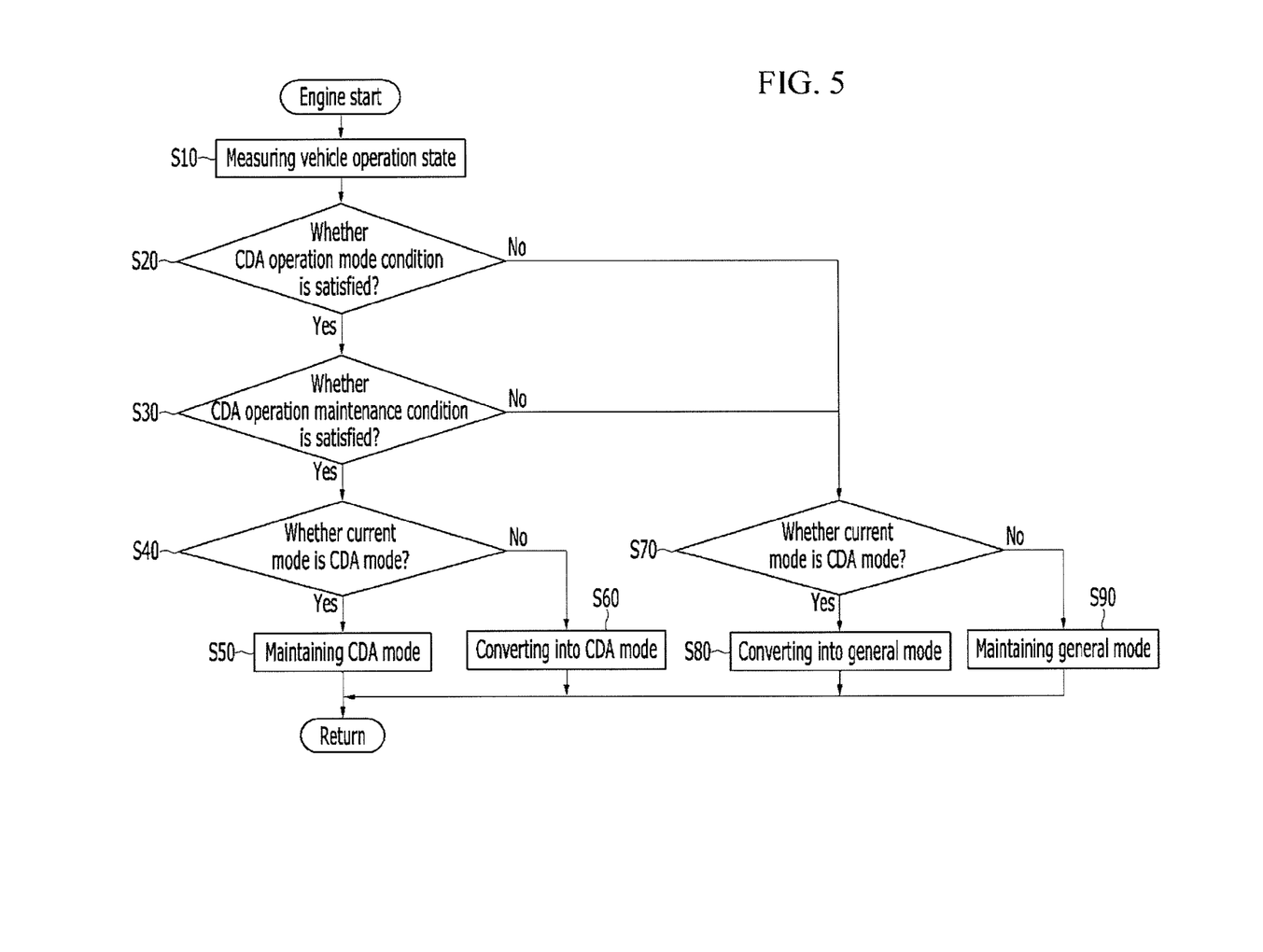
FIG. 5 is a flowchart showing a control method of a cylinder deactivation (CDA) system according to an exemplary embodiment of the present invention.

FIG. 4 is a view explaining an operation of a cylinder deactivation (CDA) system according to an exemplary embodiment of the present invention, and FIG. 5 is a flowchart showing a control method of a cylinder deactivation (CDA) system according to an exemplary embodiment of the present invention.

Next, a control method of the CDA system according to an exemplary embodiment of the present invention will be described with reference to FIG. 1 to FIG. 5.

The vehicle operation state measuring device 10 measures the vehicle operation state to output a corresponding signal (S10). The controller 30 determines whether an operation state of a current vehicle corresponds to a CDA operation mode condition depending on an output signal of the vehicle operation state measuring device 10 (S20).

The CDA operation mode condition may include a condition that a vehicle speed is equal to or less than a predetermined value, a torque is equal to or less than a predetermined value, and an excel pedal opening value is equal to or less than a predetermined value.

That is, the CDA operation mode condition may be a driving condition of a low speed and a low load state.

When the operation state of the current vehicle corresponds to the CDA operation mode condition, by the controller 30, it is determined whether there is the CDA operation maintenance condition depending on the output signal of the vehicle operation state measuring device 10 (S30).

The CDA operation maintenance condition to suppress a frequent driving mode change and to determine whether there is a benefit for maintaining the CDA operation mode, for example, considers whether a ratio of the fuel consumption of the CDA driving mode for the fuel consumption of the general operation mode is a predetermined ratio or more. Also, it may be considered whether an increasing effect of the exhaust temperature is expected during the operation with the CDA driving mode.

When the operation state of the current vehicle corresponds to the CDA operation maintenance condition and the operation mode of the current engine is the general mode, the controller 30 converts the operations of the CDA apparatus 40 and the auxiliary valve apparatus 50 into the CDA operation mode (S40, S60) or maintains the CDA operation mode (S40, S50).

When the operation state of the current vehicle does not correspond to the CDA operation mode condition or the CDA operation maintenance condition, the controller 30 converts the operation of the CDA apparatus 40 and the auxiliary valve apparatus 50 into the general operation mode (S70, S80) or maintains the general CDA operation mode (S70, S90).

The CDA operation maintenance condition may include a condition that a value determined from the fuel consumption of a case in which the operation state of the current vehicle is the general mode and the fuel consumption of a case which the operation state of the current vehicle is the CDA mode is equal to or more than a predetermined value.

The CDA operation maintenance condition may include a condition that an exhaust temperature increasing effect is equal to or more than a predetermined value when the operation state of the current vehicle is the CDA mode.

It is assumed that the engine 1 is the 4-cylinder and a combust sequence is a sequence of a first cylinder #1, a third cylinder #3, a fourth cylinder #4, and a second cylinder #2.

In an exemplary embodiment of the present invention, it is assumed that the second and third cylinders #2 and #3 are de-activated during the CDA operation mode, the connection pipes 90 and 92 connect the cylinder de-activated among the plurality of cylinders #1, #2, #3, and #4, that is the second and third cylinders #2 and #3 and the normally operated cylinder, that is the first and fourth cylinders #2 and #3.

In the drawing, "A" represents an exhaust valve profile of the de-activation cylinder, "B" represents an intake valve profile of the de-activation cylinder, "C" represents an auxiliary valve profile of the de-activation cylinder, "D" represents an exhaust valve profile of the general cylinder, "E" represents an intake valve profile of the general cylinder, and "F" represents an explosion (combust) of the general cylinder.

For convenience of understanding, it is assumed that the de-activation cylinder is the third cylinder #3 and the general cylinder is the fourth cylinder #4.

When the operation mode of the engine is converted into the CDA operation mode, the of exhaust valve of the third cylinder #3 is deactivated by the operation of the CDA apparatus 40. That is, the exhaust valve is not opened. However, as the intake valve is normally operated, the air inflows from the intake manifold 70 and the connection pipe 92 is communicate to the auxiliary valve apparatus 50 from an end of the compress stroke to a midway of explosion/expansion strokes such that a compressed air of the third cylinder 3# is supplied to the fourth cylinder #4.

In the instant case, a moment that the compressed air is supplied is a moment that the corresponding intake valve is closed for the fourth cylinder #4.

In general, at the moment that the general operation mode is the engine is changed into the CDA operation mode, a load of the cylinder that is not de-activated is increased by about 2 times, however a state that the air supply is not sufficient may be generated. However, in an exemplary embodiment of the present invention, the compressed air of the third cylinder #3 is supplied to the fourth cylinder #4 such that the output of the fourth cylinder #4 is ensured.

For the general diesel engine using the turbocharger, during cylinder de-activation, the exhaust energy supplied to the turbo is reduced such that the boost pressure formation is inferior to the general driving, however the air of the de-activation cylinder is supplied to the normal cylinder such that the normal air supply is possible.

As above-described, according to the CDA system and the control method according to an exemplary embodiment of the present invention, the compressed air of the de-activation cylinder is supplied to the combust cylinder such that the fuel consumption improvement is possible.

Also, according to the CDA system and the control method according to an exemplary embodiment of the present invention, the air supply to the operation cylinder is sufficient such that it is easy to raise the exhaust gas temperature.

While this invention has been described in connection with what is presently considered to be practical exemplary embodiments, it is to be understood that the invention is not limited to the disclosed exemplary embodiments. On the contrary, it is intended to cover various modifications and equivalent arrangements included within the spirit and scope of the appended claims.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cylinder deactivation (CDA) system comprising:
   a plurality of cylinders of a turbocharged internal combustion engine;
   a cylinder deactivation (CDA) apparatus including an exhaust cam and configured to selectively de-activate an operation of an exhaust valve of a predetermined cylinder among the plurality of cylinders;
   a connection pipe connecting a de-activated cylinder to a normally operated cylinder among the plurality of cylinders;
   an auxiliary valve apparatus configured for opening or closing the connection pipe to supply a compressed air of the de-activated cylinder among the plurality of cylinders to the normally operated cylinder;
   an engine operation state measuring device including an engine speed sensor, an excel pedal opening sensor, a vehicle speed sensor, a torque sensor, a cooling coolant temperature sensor, an atmosphere temperature sensor, and an exhaust temperature sensor and configured for measuring an engine operation state to output a corresponding signal, respectively; and
   a controller configured for controlling operations of the CDA apparatus and the auxiliary valve apparatus depending on the corresponding signal of the engine operation state measuring device;
      wherein the auxiliary valve apparatus is controlled by the controller to be opened during an expansion stroke of the dc-activated cylinder; and
      wherein the auxiliary valve apparatus is controlled by the controller to be opened to supply the compressed air of the de-activated cylinder to the compress stroke of the connected cylinder.

2. The CDA system of claim 1,
   wherein the controller is configured to determine whether there are a CDA operation mode condition and a CDA operation maintenance condition depending on a signal of the engine operation state measuring device; and
   wherein in a case of the CDA operation mode condition and the CDA operation maintenance condition, the controller is configured to switch the operations of the CDA apparatus and the auxiliary valve apparatus into the CDA operation mode, or is configured to maintain the CDA operation mode.

3. The CDA system of claim 2,
   wherein the CDA operation mode condition includes a condition that an engine speed is equal to or less than a predetermined value, a torque is equal to or less than a predetermined value, and an excel pedal opening value is equal to or less than a predetermined value.

4. The CDA system of claim 2,
   wherein the CDA operation maintenance condition includes a condition that a value determined from a fuel consumption when the engine operation state of a current engine is an actual mode and determined from the fuel consumption when the current engine operation state is a CDA operation mode, is equal to or more than a predetermined value.

5. The CDA system of claim 4,
   wherein the CDA operation maintenance condition includes a condition that a temperature increasing effect is equal to or more than a predetermined value wherein the current engine operation state is the CDA operation mode.

6. The CDA system of claim 1, further including:
   a turbocharger operated by an exhaust gas from each of the plurality of cylinders.

7. A control method for a cylinder deactivation (CDA) system including a plurality of cylinders of an engine; a turbocharger operated by an exhaust gas of each of the plurality of cylinders; a cylinder deactivation (CDA) apparatus including an exhaust cam and selectively de-activating an operation of an exhaust valve of a predetermined cylinder among the plurality of cylinders; a connection pipe connecting a de-activated cylinder to a normally operated cylinder among the plurality of cylinders; an auxiliary valve apparatus controlled by a controller for opening or closing the connection pipe to supply a compressed air of the de-activated cylinder among the plurality of cylinders to the normally operated cylinder; an engine operation state measuring device configured for measuring an engine operation state to output a corresponding signal; and the controller configured for controlling operations of the CDA apparatus and the auxiliary valve apparatus depending on the corresponding signal of the engine operation state measuring device, the control method comprising:
   determining whether a current engine operation state corresponds to a CDA operation mode condition depending on an output signal of the engine operation state measuring device by the controller;
   determining whether there is a CDA operation maintenance condition depending on the output signal of the engine operation state measuring device by the controller when the current engine operation state is the CDA operation mode condition; and
   switching the operations of the CDA apparatus and the auxiliary valve apparatus into the CDA operation mode by the controller when the current engine operation state corresponds to the CDA operation maintenance condition and the operation mode of the current engine is a general mode;
      wherein the auxiliary valve apparatus is control by the controller to be opened during an expansion stroke of the de-activated cylinder; and
      wherein the auxiliary valve apparatus is controlled by the controller to be opened to supply the compressed air of the de-activated cylinder to the compress stroke of the connected cylinder.

8. The control method of claim 7, wherein the CDA operation mode condition includes a condition that an engine speed is equal to or less than a predetermined value, a torque is equal to or less than a predetermined value, and an excel pedal opening value is equal to or less than a predetermined value.

9. The control method of claim 7,
wherein the CDA operation maintenance condition includes a condition that a value determined from a fuel consumption when the engine operation state of a current engine is a general mode and determined from the fuel consumption when the current engine operation state is a CDA operation mode, is equal to or more than a predetermined value.

10. The control method of claim 9,
wherein the CDA operation maintenance condition includes a condition that a temperature increasing effect is equal to or more than a predetermined value when the current engine operation state is the CDA operation mode.

\* \* \* \* \*